Aug. 13, 1940.    L. W. COOK    2,211,594

ELECTRIC SWITCH

Filed March 21, 1939

Inventor:
Leonard W. Cook,
by Harry E. Dunham
His Attorney.

Patented Aug. 13, 1940

2,211,594

UNITED STATES PATENT OFFICE 2,211,594

ELECTRIC SWITCH

Leonard W. Cook, Stratford, Conn., assignor to General Electric Company, a corporation of New York Application March 21, 1939, Serial No. 263,162

10 Claims. (Cl. 200—33)

The present invention relates to electric switches employing liquid contact circuit controllers, and more particularly to circuit controllers of the type employing a mechanical barrier having an opening adapted to be immersed in and withdrawn from the conducting liquid by rotation of the circuit controller.

It is an object of this invention to provide a circuit controller of the above type having means for altering the normal level of the conducting liquid to delay the circuit controlling action thereof.

It is another object of this invention to provide a circuit controller in which one switching function is accomplished with a time delay and another switching function is accomplished instantaneously.

Figure 1:
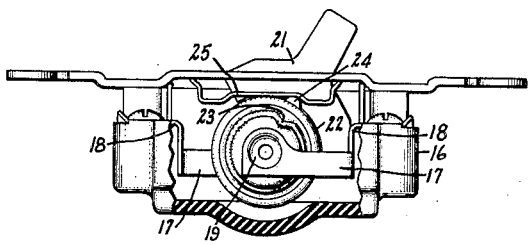
Figure 2:
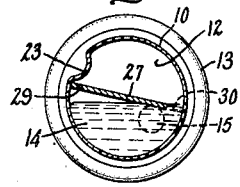
Figure 3:
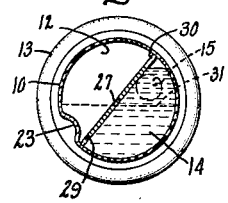
Figure 4:
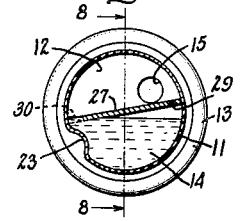
Figure 8:
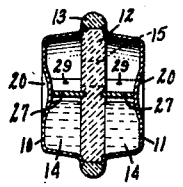
Figure 9:
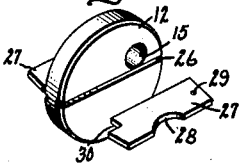

Further objects and advantages of the present invention will become apparent as the following description proceeds, reference being had to the accompanying drawing in which Fig. 1 is an elevational view partially broken away showing a mounting for a circuit controller embodying the present invention; Figs. 2 and 3 are elevational views in section of one form of the present invention; Figs. 4 to 7 are elevational views also in section of a modified form of the present invention; Fig. 8 is a sectional view taken along the line 8—8 of Fig. 4, and Fig. 9 is a perspective view showing structural details of the circuit controller.

Referring to the drawing I have shown my invention embodied in a circuit controller comprising a pair of cup-shaped metal terminals 10 and 11 which are arranged on opposite sides of a barrier 12 of insulating material which is, preferably, also a ceramic material. The edges of the terminals are sealed together and to the barrier 12 by a bead of glass 13 which extends circumferentially around the edge of the barrier. A quantity of conducting liquid 14, such as mercury, is contained in the substantially cylindrical envelope formed by the cup-shaped terminals and the barrier. The barrier 12 is provided with a suitable opening 15 which in the open circuit position of the switch is postioned above the normal level of the conducting liquid so that the barrier is effective to divide the conducting liquid into two pools. When the switch is rotated to the closed circuit position of the controller, the opening is immersed in the conducting liquid which then connects the metal terminals 10 and 11. The construction thus far described is disclosed with more particularity in Payne Patent No. 2,101,092, issued December 7, 1937.

In Fig. 1 I have shown a suitable casing and mounting for a circuit closer embodying the present invention. In the drawing a switch casing 16 is suitably recessed to receive a pair of circuit controllers which are mounted with their axes in alignment and only one of which is visible in Fig. 1. Each controller is mounted between a pair of resilient arms 17 of conducting material which are provided at one end with a terminal portion 18 secured to the switch casinig and at the other end with a spherical surface 19 which is adapted to frictionally engage a similarly shaped depression 20 formed in each of the cup-shaped terminals. This construction provides means for mounting the circuit closer in the switch casing for rotation about its axis. An operating member 21 of molded insulating material is positioned between the circuit closers and is provided with an arcuate flange 22 extending from its opposite sides and overlying one terminal of each of the circuit closers. The flange is provided with a depending projection (not shown) which engages a depression 23 in one of the terminals to form a driving connection therewith. As illustrated a projection 24 extending upwardly from the opposite side of the arcuate flange 22 engages a resilient wire 25 which is arranged to provide frictional damping and a stop for the circuit controller.

In accordance with the present invention baffles are arranged between the barrier 12 and the terminals 10 and 11 to change the normal level of the conducting liquid when the circuit controller is rotated from one position to another. Referring to Figs. 8 and 9 the barrier is provided on its opposite sides with a suitable groove 26 which receives one edge of a baffle member 27 and positions it relative to the barrier. Each of the baffles is secured to one of the cup-shaped terminals in any suitable way as by welding. As shown in Figs. 8 and 9, one edge of the baffle is cut away at 28 to receive the depression 20 of the terminal. Near one end each baffle is provided with a relatively small aperture 29 and near the outer end with an aperture or notch 30 of larger cross-section. The baffles positioned in the two compartments into which the envelope is divided by the insulating barrier are preferably of identical construction as illustrated.

Without the baffle construction above-described and with the opening 15 of the ceramic barrier below the level of the conducting liquid as illustrated in Fig. 2, it is apparent that the circuit between the terminals 10 and 11 is closed. When the switch is rotated about its axis in a counterclockwise direction to the position shown in Fig. 3, the opening 15 is withdrawn from the conducting liquid, the normal level of which is indicated by the dotted line 31, and the circuit between the terminals is opened. With the baffles arranged between the barrier and the cup-shaped terminals as illustrated in Figs. 2 and 3, and with the small aperture 29 formed in the portion of the baffle away from the opening 15, it is apparent that rotation of the circuit controller from the position shown in Fig. 2 to the position shown in Fig. 3 is effective to confine the conducting liquid and temporarily maintain a portion thereof adjacent the opening 15 above its normal level. As the conducting liquid returns to its normal level by passage through the restricted aperture 29, it recedes from the opening 15 and the circuit is opened a period of time after the switch is rotated to the position shown in Fig. 3. The length of time is dependent upon the size of the aperture 29 and also upon its position, as it is apparent that the static head tending to force the liquid through the aperture 29 is dependent upon the position of the aperture along the length of the barrier. If the switch is rotated back in a clockwise direction to the position shown in Fig. 2 after the conducting liquid has returned to its normal level, the circuit will be closed instantaneously inasmuch as the aperture 30 is of comparatively large cross-section and is designed to permit substantially instantaneous passage of the conducting liquid from one side of the baffle to the other.

From the foregoing it is clear that in the operation of the switch described above the circuit between the terminals 10 and 11 is opened with a time delay when the circuit controller is rotated to the position shown in Fig. 3, and is closed substantially instantaneously when the circuit controller is rotated back to the position shown in Fig. 2. It is not necessary that the apertures 29 and 30 be located centrally along the longitudinal axis of the baffle. They may both be positioned centrally as illustrated in connection with the aperture 29, or they may both be formed as notches at one edge of the baffle as illustrated in connection with the aperture 30.

Figure 5:
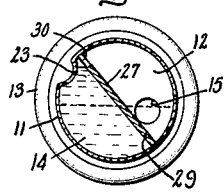

In Figs. 4 and 5 there is illustrated a modified form of my invention which is arranged to provide a delay in the completion of the circuit between the terminals 10 and 11 when the circuit controller is rotated to its closed circuit position and which is effective to open the circuit instantaneously when the circuit controller is rotated to its open circuit position. In this modification it will be noted that the baffles 27 are located on the opposite side of opening 15 from that illustrated in Figs. 2 and 3 so that as the circuit controller is rotated to its closed circuit position the baffles are effective to push the conducting liquid away from the opening 15. In this modification the time controlling or small aperture 29 is located in the end of the baffle adjacent the opening 15, and the large aperture 30 is located near the opposite end. This location of apertures is the reverse of that previously described in connection with Figs. 2 and 3. As the mercury is pushed away from the opening 15 when the circuit controller is rotated to its closed circuit position, a portion of the conducting liquid is necessarily raised above its normal level. The conducting liquid returns to its normal level through the aperture 29 and after a period of time depending on the size and location of the aperture 29 is effective to close the circuit between the terminals 10 and 11 through the opening 15.

Figure 6:
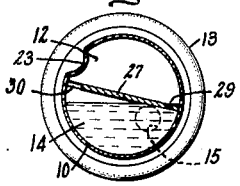
Figure 7:
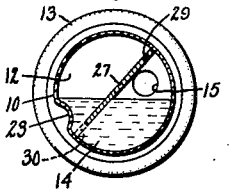

In Figs. 6 and 7 I have illustrated the modification of Figs. 4 and 5 as it appears after it has been rotated 180° about a horizontal axis lying in the plane of the barrier 12. It will be noted that in this case the baffles 27 are ineffective to appreciably disturb the normal level of the conducting liquid so that both the circuit opening and circuit closing functions of the circuit controller are accomplished substantially instantaneously upon rotation of the circuit controller. This construction makes it possible to render the time delay feature inoperative by simply reversing the position of the circuit closer in its mounting in the manner indicated.

In manufacturing liquid contact switches having a time delay feature incorporated therein in accordance with the present invention, it is necessary to stock only one set of parts for both the delayed-on and delayed-off switch constructions, as the only difference in the two is in the positioning of the parts which may be taken care of during assembly. As illustrating this, reference may be had to the modification shown in Figs. 4 and 5 which as previously explained may have the time delay feature rendered inoperative by rotating it 180° in a horizontal axis lying in the plane of the barrier to the position shown in Figs. 6 and 7. It is apparent that if the baffle members 27 of these last figures were turned end for end, the switch would then operate with a time delay in the circuit opening operation which is the operation of the modification illustrated in Figs. 2 and 3. In other words, by properly positioning the ceramic barrier with respect to the terminals and the baffle members with respect to the barrier, it is possible to assemble either type of switch from one set of parts. This feature is particularly desirable from a manufacturing viewpoint in that it reduces the number of parts required as well as the cost of manufacture.

In the above description and in the appended claims reference is made to the normal level of the conducting liquid. This expression is intended to indicate the level to which the conducting liquid returns under the influence of gravity after the switch has been rotated from one position to another. The slight variation in the liquid level that occurs because of the volume of liquid received in the opening 15 when it is immersed has been disregarded in the present description. If desired this change in level may be readily compensated for by arranging a suitable depression in the barrier in such a position that it is immersed in the liquid as the opening 15 is withdrawn so that the liquid displaced by the barrier is the same in all positions of the switch.

What I claim as new and desire to secure by Letters Patent of the United States is:

1. In an electric switch, an envelope containing a conducting liquid and rotatable about its axis from one circuit-controlling position to another, said envelope comprising a barrier of insulating material and a pair of hollow open-ended metal terminals positioned on opposite sides of said barrier and having their open ends insulated thereby, said barrier having an opening therein adapted successively to be immersed in and withdrawn from said conducting liquid to accomplish a switching function when said envelope is rotated, and a baffle member having a flow-controlling opening therein positioned between said baffle member and each of said metal terminals to delay said switching function.

2. In an electric switch, a substantially cylindrical envelope containing a conducting liquid and rotatable about its axis from one circuit-controlling position to another, said envelope comprising a barrier of insulating material, and a pair of hollow open-ended metal terminals positioned on opposite sides of said barrier and having their open ends insulated thereby, said barrier having an opening therein adapted successively to be immersed in and withdrawn from said conducting liquid to accomplish a switching function when said envelope is rotated, and flat baffle means positioned in said envelope between each of said terminal members and said barrier and lying in a plane parallel to the axis of said envelope to raise the normal level of the conducting liquid in said envelope when said envelope is rotated whereby said switching function is delayed.

3. In an electrical switch, an envelope containing a conducting liquid and rotatable about its axis from one circuit controlling position to another, a barrier of insulating material extending across said envelope and dividing said liquid into two pools, said barrier having an opening formed therein adapted successively to be immersed in and withdrawn from said conducting liquid by rotation of said envelope, a baffle positioned on each side of said barrier and effective when said envelope is rotated to raise at least a portion of the conducting liquid in each of said pools above its normal level, said baffles each having an aperture therein through which conducting liquid passes to return said pools to their normal level.

4. In an electrical switch, an envelope containing a conducting liquid and rotatable about its axis from one circuit controlling position to another, a barrier of insulating material extending across said envelope and dividing said liquid into two pools, said barrier having an opening formed therein adapted successively to be immersed in and withdrawn from said conducting liquid by rotation of said envelope to perform switching functions, and means for raising and temporarily maintaining at least a portion of the conducting liquid in each of said pools above its normal level when said envelope is rotated from one circuit controlling position to another whereby one of said switching functions is accomplished with a time delay.

5. In an electrical switch, an envelope containing a conducting liquid and rotatable about its axis from one circuit controlling position to another, a barrier extending across said envelope and dividing it into two compartments, said barrier having an opening formed therein adapted successively to be immersed in and withdrawn from said conducting liquid when said envelope is rotated, and a baffle in each of said compartments between said barrier and the ends of said envelope for moving said conducting liquid away from said opening when said envelope is rotated to closed circuit position, said baffles each having an aperture therein through which the conducting liquid passes to immerse said opening a predetermined time after said envelope is rotated to closed circuit position.

6. In an electrical switch, an envelope containing a conducting liquid and rotatable about its axis from one circuit controlling position to another, a barrier extending across said envelope and dividing it into two compartments, said barrier having an opening formed therein adapted successively to be immersed in the conducting liquid when said envelope is rotated to closed circuit position and a baffle in each of said compartments for raising at least the portion of said conducting liquid adjacent said opening above its normal level when said switch is rotated to open circuit position, said baffles each having an aperture therein through which the conducting liquid passes in returning to its normal level whereby said switch is effective to open said circuit a predetermined time after said envelope is moved to open circuit position.

7. In an electrical switch, an envelope containing a conducting liquid and rotatable about its axis from one circuit controlling position to another, a barrier extending across said envelope and dividing it into two compartments, said barrier having an opening formed therein adapted successively to be immersed in and withdrawn from said conducting liquid when said envelope is rotated, a baffle in each of said compartments extending from one face of said barrier to an end of said envelope, one end of each of said baffles being positioned adjacent said opening, spaced apertures extending through said baffles, one of said apertures being of a cross-section to delay the flow of conducting liquid therethrough, the other of said apertures being of larger cross-section to allow the conducting liquid to pass therethrough substantially without delay.

8. In an electrical switch, a substantially cylindrical envelope containing a conducting liquid and rotatable about its axis from one circuit controlling position to another, a barrier of insulating material extending across said envelope and having an opening formed therein adapted successively to be immersed in and withdrawn from said conducting liquid by rotation of said envelope, a flat baffle extending across said envelope between one side of said barrier and an end of said envelope with one end thereof adjacent said opening, said baffle having spaced apertures therethrough located on opposite sides of the axis of said envelope, one of said apertures being of a cross-section to delay the flow of conducting liquid from one side of said baffle to the other when said envelope is in one circuit controlling position, the other of said apertures having a larger cross-section permitting substantially instantaneous passage of the conducting liquid from one side of said baffle to the other when said envelope is in another circuit controlling position.

9. In an electrical switch, an envelope containing a conducting liquid and rotatable about its axis from one circuit controlling position to another, said envelope comprising a barrier of insulating material and a pair of cup-shaped terminals positioned on opposite sides of said barrier and having their open ends sealed thereto, said barrier having an opening therein adapted successively to be immersed in and withdrawn from said conducting liquid when said envelope is rotated, and a baffle member positioned between said barrier and each of said metal terminals and having one edge secured to one of said terminals and another edge positioned in a groove in said barrier.

10. In an electrical switch, a substantially cylindrical envelope containing a conducting liquid and rotatable about its axis from one circuit controlling position to another, said envelope comprising a mechanical barrier and a pair of cup-shaped terminals positioned on opposite sides of said barrier and having their open ends sealed thereto, said barrier having an opening therein adapted successively to be immersed in and withdrawn from said conducting liquid when said envelope is rotated and a flat baffle member positioned between said barrier and each of said terminals and having one edge welded to one of said terminals and another edge positioned in a groove in said barrier, each of said baffles also having spaced apertures therein, one of said apertures being of a cross-section to delay the flow of conducting liquid from one side of said baffle to the other when said envelope is in one circuit controlling position and the other of said apertures being of sufficient cross-section to permit the conducting liquid to pass from one side of said baffle to the other substantially without delay when said envelope is in another circuit controlling position.

LEONARD W. COOK.